(12) United States Patent
Vaahteranoksa et al.

(10) Patent No.: US 9,912,846 B2
(45) Date of Patent: Mar. 6, 2018

(54) OBTAINING CALIBRATION DATA OF A CAMERA

(71) Applicant: Microsoft Technology Licensing, LLC, Redmond, WA (US)

(72) Inventors: Mikko Vaahteranoksa, Espoo (FI); Jean-Luc Olives, Espoo (FI); Petteri Valve, Helsinki (FI); Euan Barron, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/152,276

(22) Filed: May 11, 2016

(65) Prior Publication Data

US 2017/0330326 A1 Nov. 16, 2017

(51) Int. Cl.
| | | |
|---|---|---|
| *H04N 5/217* | (2011.01) | |
| *H04N 1/00* | (2006.01) | |
| *G06T 7/80* | (2017.01) | |
| *G12B 13/00* | (2006.01) | |
| *G03B 43/00* | (2006.01) | |

(52) U.S. Cl.
CPC ........... *H04N 5/2178* (2013.01); *G03B 43/00* (2013.01); *G06T 7/80* (2017.01); *G12B 13/00* (2013.01); *H04N 1/00819* (2013.01); *G05B 2219/42152* (2013.01)

(58) Field of Classification Search
None
See application file for complete search history.

(56) References Cited

U.S. PATENT DOCUMENTS

| | | |
|---|---|---|
| 7,084,911 B1 | 8/2006 | Lee et al. |
| 7,235,773 B1 | 6/2007 | Newman |
| 7,317,480 B1 | 1/2008 | Cho et al. |
| 7,960,699 B2 | 6/2011 | Chang et al. |
| 8,115,835 B2 | 2/2012 | Noguchi et al. |
| 8,233,066 B2 | 7/2012 | Zheng et al. |
| 8,405,747 B2 | 3/2013 | Mo et al. |

(Continued)

FOREIGN PATENT DOCUMENTS

EP 2618560 A1 7/2013

OTHER PUBLICATIONS

"Image Capture: High-Speed Cameras add Smart Features", In Magazine of Vision System Design, vol. 14, Issue 5, May 1, 2009, 2 pages.

(Continued)

*Primary Examiner* — Mark T Monk

(57) ABSTRACT

According to an aspect, there is provided an apparatus comprising at least one processor and at least one memory connected to the at least one processor. The at least one memory stores program instructions that, when executed by the at least one processor, cause the apparatus to determine based on at least one indicator that a camera connected to the apparatus is in a dark environment, initiate a calibration sequence of the camera in response to determining based on the at least one indicator that the camera connected to the apparatus is in a dark environment, capture, during the calibration sequence, multiple images with the camera with different sets of shooting parameters, cause analysis of the captured images to obtain camera calibration data, and store the camera calibration data in a memory of the apparatus.

20 Claims, 3 Drawing Sheets

(56) References Cited

U.S. PATENT DOCUMENTS

| | | |
|---|---|---|
| 8,749,670 B1 | 6/2014 | Liu et al. |
| 8,872,093 B2 | 10/2014 | Lee et al. |
| 9,049,381 B2 | 6/2015 | Venkataraman et al. |
| 2003/0202111 A1 | 10/2003 | Park |
| 2008/0231725 A1 | 9/2008 | Sakamoto et al. |
| 2013/0206959 A1 | 8/2013 | Zhang |
| 2013/0258144 A1 | 10/2013 | Chen et al. |
| 2014/0222436 A1 | 8/2014 | Binder et al. |
| 2015/0195440 A1* | 7/2015 | Lee .................. H04N 5/2353 348/238 |
| 2015/0312488 A1 | 10/2015 | Kostrzewa et al. |

OTHER PUBLICATIONS

"Black Shading Calibration", Retrieved on: Dec. 17, 2015, 3 pages, Available at: http://www.red.com/learn/red-101/black-shading-calibration.

"International Search Report and Written Opinion Issued in PCT Application No. PCT/US2017/030942", dated Aug. 7, 2017, 14 Pages.

\* cited by examiner

OBTAINING CALIBRATION DATA OF A CAMERA

BACKGROUND

When cameras or camera modules for various electronic devices are manufactured, the spatial black level of a camera module may vary from module to module. In addition to the spatial black level, there may be defective pixels (too bright or too dark pixels) and fixed pattern noise which then appear on the same location from image to image when the camera module is used to record image data. Some calibration can be done during camera module manufacturing, but the final spatial black level is usually known only after the camera module integration to a product.

SUMMARY

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, an apparatus is provided. The apparatus comprises at least one processor and at least one memory connected to the at least one processor. The at least one memory stores program instructions that, when executed by the at least one processor, cause the apparatus to determine based on at least one indicator that a camera connected to the apparatus is in a dark environment, initiate a calibration sequence of a camera in response to determining based on the at least one indicator that the camera connected to the apparatus is in a dark environment, capture, during the calibration sequence, multiple images with the camera with different sets of shooting parameters, cause analysis of the captured images to obtain camera calibration data, and store the camera calibration data in a memory of the apparatus.

In another embodiment, a method is provided. The method comprises determining based on at least one indicator that a camera is in a dark environment, wherein the at least one indicator comprises data from at least one of an ambient light sensor and a proximity sensor, initiating a calibration sequence of the camera in response to determining based on the at least one indicator that the camera connected to the apparatus is in a dark environment, capturing, during the calibration sequence, multiple images with the camera with different sets of shooting parameters, causing analysis of the captured images to obtain camera calibration data, and storing the camera calibration data in a memory.

In another embodiment, an apparatus is provided. The apparatus comprises at least one processor, at least one memory connected to the at least one processor and a camera. The at least one memory stores program instructions that, when executed by the at least one processor, cause the apparatus to determine based on at least one indicator that the apparatus is in a dark environment, wherein the at least one indicator comprises data from at least one of an ambient light sensor and a proximity sensor, initiate a calibration sequence of the camera in response to determining based on the at least one indicator that the camera connected to the apparatus is in a dark environment, and capture, during the calibration sequence, multiple images with the camera with different sets of shooting parameters to enable determination of camera calibration data based on image data of the captured images.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples. Furthermore, as used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

Various embodiments are provided for initiating and obtaining calibration data of a camera. A calibration sequence of the camera is initiated when it is determined based on at least one indicator that the camera is in a dark environment. The calibration sequence may involve capturing multiple images with the camera with different sets of shooting parameters in order to enable generation of calibration data of the camera. The decision to initiate the calibration sequence may be done, for example, by analyzing data from at least one of an ambient light sensor and a proximity sensor and determining based on the data that the camera is in a dark environment. At least some of the illustrated embodiments provide a solution where the initiation of the calibration sequence is automatic without any manual action or input from a user. Further, at least one calibration initiation condition may be additionally used in order to initiate the calibration sequence. Therefore, at least some of the illustrated embodiments enable, for example, more accurate definition of specific circumstances when to automatically initiate the calibration sequence and may also prevent performing the calibration sequence in situations that might annoy a user.

Figure 1:
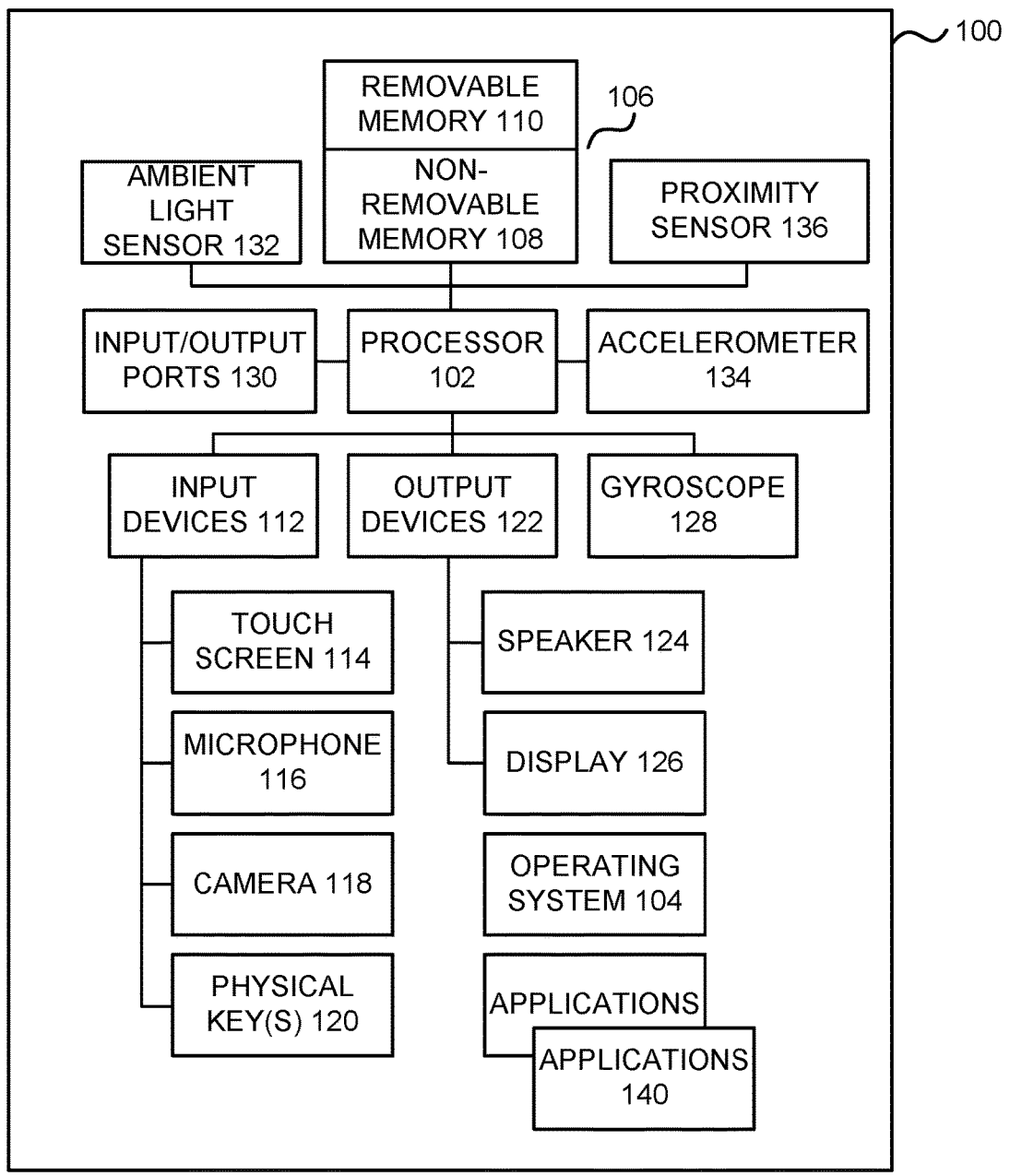
FIG. 1 is a system diagram depicting an apparatus including a variety of optional hardware and software components.

FIG. 1 is a system diagram depicting an apparatus 100 including a variety of optional hardware and software components. Any components in the apparatus may communicate with any other component, although not all connections are shown, for ease of illustration. The apparatus may be any of a variety of computing devices (for example, an electronic meeting room apparatus, a client device, a server in a private or public network etc.) and may allow wireless two-way communications with one or more communications networks, such as a data, cellular or satellite network. The apparatus is, for example, a smart phone, a mobile device, a tablet computer, a gaming console or a laptop computer or any other device comprising a camera or a camera module.

The illustrated apparatus 100 comprises a controller or processor 102 (e.g., signal processor, microprocessor, ASIC, or other control and processing logic circuitry) for performing such tasks as signal coding, data processing, input/output processing, power control, and/or other functions. An operating system 104 controls the allocation and usage of the components of the apparatus 100 and supports for one or more application programs 140.

The illustrated apparatus 100 comprises a memory 106. The memory 106 may include non-removable memory 108 and/or removable memory 110. The non-removable memory 108 may include RAM, ROM, flash memory, a hard disk, or other well-known memory storage technologies. The removable memory 110 may include, for example, a flash memory, or other well-known memory storage technologies, such as "smart cards". The memory 106 may be used for storing data and/or code for running the operating system 104 and the applications 140. Example data may include sound files, video data, or other data sets to be sent to and/or received from one or more network servers or other devices via one or more wired or wireless networks.

The apparatus 100 supports one or more input devices 112, such as a touchscreen 114, microphone 116, a camera or a camera module 118 and/or physical keys or a keyboard 120 and one or more output devices 122, such as a speaker 124 and a display 126. Depending on the apparatus 100, a separate camera module may be used. Alternatively or in addition, the camera may be integrated into another apparatus element, for example, to a circuit board or to a display. Yet in another embodiment, the camera may be an external camera connected to the apparatus 100. Some devices can serve more than one input/output function. For example, the touchscreen 114 and the display 126 can be combined in a single input/output device. The input devices 112 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 104 or applications 140 may comprise speech-recognition software as part of a voice user interface that allows a user to operate the apparatus 100 via voice commands. Further, the apparatus 100 may comprise input devices and software that allows for user interaction via a user's spatial gestures, such as detecting and interpreting gestures to provide input to a gaming application.

A wireless modem may be coupled to an antenna (not shown) and can support two-way communications between the processor 102 and external devices, as is well understood in the art. The modem is shown generically and may include a cellular modem for communicating with a mobile communication network and/or other radio-based modems (e.g., BLUETOOTH or Wi-Fi).

The apparatus 100 may further include a gyroscope 128, at least one input/output port 130, an ambient light sensor 132, an accelerometer 134, a proximity sensor 136, and/or a physical connector, which can be an Ethernet port, a Universal Serial Bus (USB) port, Institute of Electrical and Electronics Engineers (IEEE) 1394 (FireWire) port, and/or Recommended Standard (RS) 232 port. The illustrated components of the apparatus 100 are not required or all-inclusive, as any components can deleted and other components can be added.

Any combination of the illustrated components disclosed in FIG. 1, for example, at least one of the processor 102, the memory 106, the gyroscope 128, the ambient light sensor 132, the accelerator 134, and the proximity sensor 136 may constitute means for determining based on at least one indicator that a camera connected to the apparatus is in a dark environment, means for initiating a calibration sequence of a camera in response to determining based on the at least one indicator that the camera connected to the apparatus is in a dark environment, means for capturing, during the calibration sequence, multiple images with the camera with different sets of shooting parameters, means for causing analysis of the captured images to obtain camera calibration data, and means for storing the camera calibration data in a memory of the apparatus.

Figure 2A:
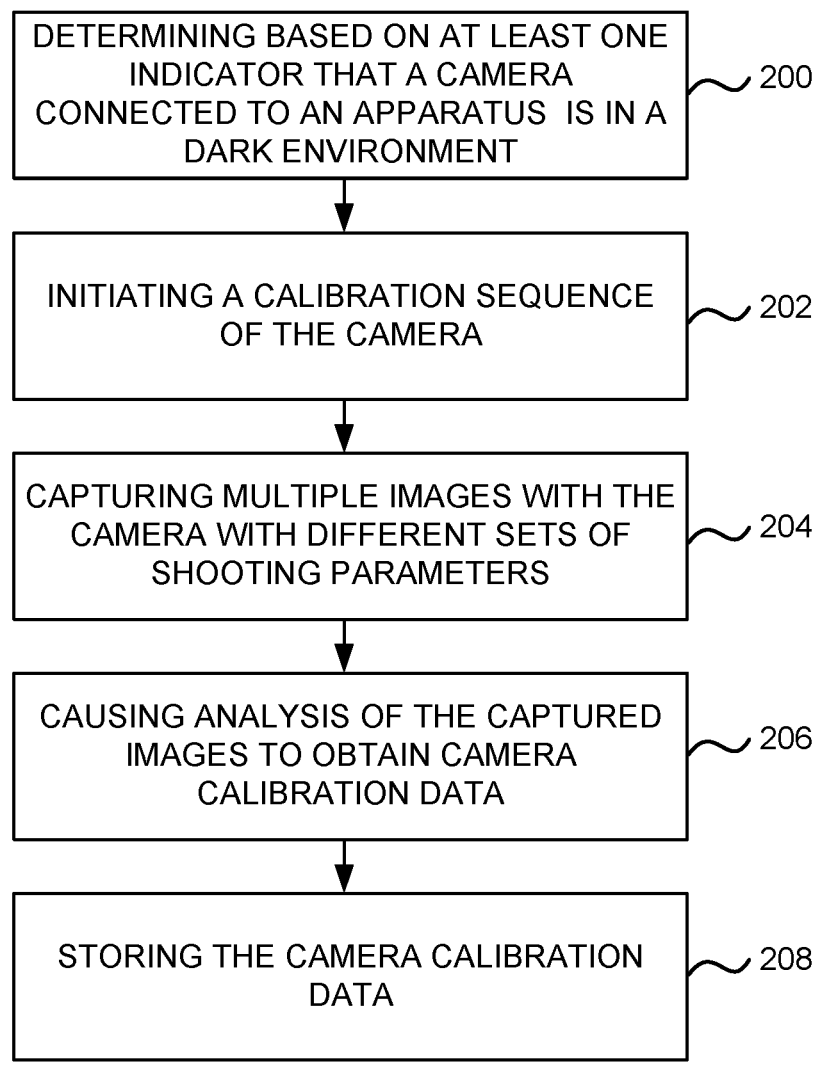
FIG. 2A discloses a flow chart illustrating a method for obtaining calibration data of a camera.

FIG. 2A discloses a flow chart illustrating an embodiment for obtaining calibration data of a camera. A camera of an electronic apparatus, for example, a smart phone, a mobile device, a tablet computer, a laptop computer or a gaming console, has typically been calibrated during the manufacturing phase of the camera. The calibration may, however, not be accurate at a later stage when the camera is used to record image files. Therefore, calibration of the camera may need to be performed also after the manufacturing phase.

At 200 it is determined based on at least one indicator that a camera connected to an apparatus comprising a camera is in a dark environment. The apparatus may comprise the camera or alternatively the camera may be an external camera. When calibration of the camera is to be performed, for the best results, the calibration should be performed in a situation or an environment where the amount of light reaching an image sensor of the camera is limited or non-existent. In one embodiment, the at least one indicator comprises data from at least one of an ambient light sensor and a proximity sensor. If the ambient light sensor and/or the proximity sensor provides data indicating that the apparatus is in an environment where the amount of light reaching an image sensor of the camera is limited or non-existent, at 202 a calibration sequence of the camera can be initiated without any user action or input.

The calibration sequence may be a predetermined sequence where images are captured using various shooting parameters. Therefore, at 204 multiple images are captured during the calibration sequence with the camera with different sets of shooting parameters. When the calibration sequence is performed with different sets of shooting parameters, this enables determination of camera calibration data based on image data of the captured images. The shooting parameters may include gain, exposure time and/or temperature. For example, during the calibration sequence, the camera captures a series of images, for example, raw image using varying gains (for example, gains 1×-8×) and exposure times (for example, 66 ms-4 s). It is evident that any other gain or exposure time range may also be used.

The end result of the calibration may be enhanced if, in addition to varying gain and exposure time, also varying temperature during the calibration. The camera may include a temperature sensor measuring temperature of the image sensor. This temperature information may thus be used when performing the calibration sequence.

At 206 analysis of the captured images is caused to obtain camera calibration data. In one embodiment, the apparatus itself processes and analyzes image data of the captured images. In another embodiment, the apparatus may send the image data to a network server (for example, a cloud service) via a network connection, and the image data is then analyzed by the network server. The obtained camera calibration data may then be returned back to the apparatus from the network server. If the apparatus determines that the obtained calibration data deviates from existing calibration data more than a predetermined amount, the apparatus may discard the obtained calibration data. If the deviation is significantly greater than the predetermined amount, the calibration sequence probably was performed in an environment comprising too much light.

At 208 the calibration data is stored by the apparatus in a memory. In one embodiment, pedestal calibration data for each shooting parameter set (for example, exposure time, gain and temperature) may be subsampled and stored. When an image or a video frame is captured with the shooting parameter sets, then the stored data can be interpolated up and applied to the captured image during the pedestal correction stage of the image processing to correctly remove the black pedestal from the image data. The data for defects can be analyzed for defect locations and those stored. These locations can then be corrected in a captured image or video frame with the corresponding shooting parameter set present at the calibration defect locations. After the defect location is known, it can be fixed (for example, by interpolating) to match neighbor pixels after capturing each image. The calibration data may also be used in cases where there is spatial variation in a black level in images. The calibration data may be used to correct the black level in the images.

FIG. 2A illustrates a solution that enables automatic initiation of a calibration sequence without any manual action or input from a user. Further, since the calibration is initiated only when the apparatus is in a dark environment, calibration results are more reliable.

Figure 2B:
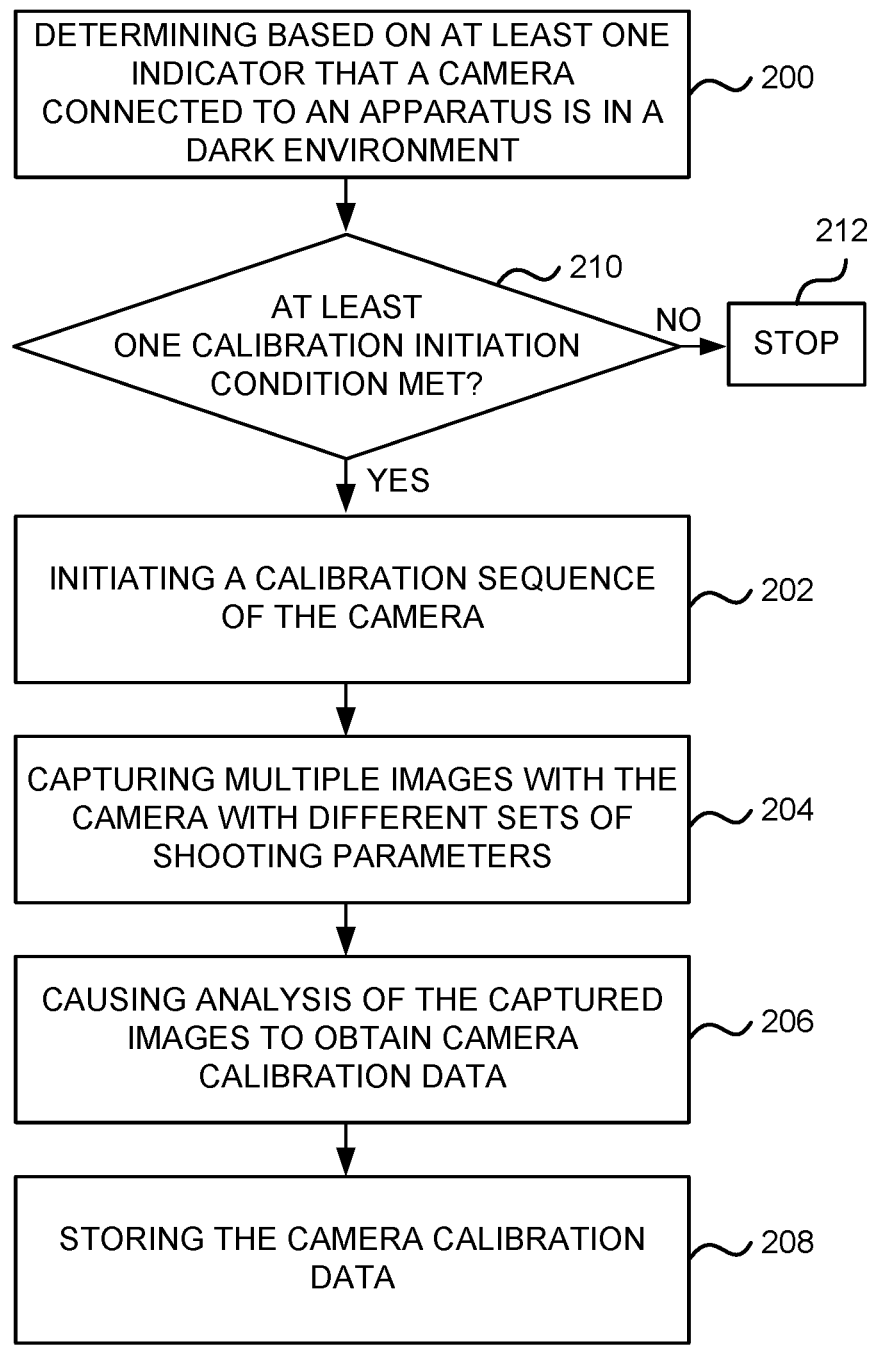
FIG. 2B discloses a flow chart illustrating a method for obtaining calibration data of a camera.

FIG. 2B discloses a flow chart illustrating another embodiment for obtaining calibration data of a camera. The difference between the embodiments illustrated in FIGS. 2A and 2B is that in FIG. 2B after 202 at 210 it is checked whether at least one calibration initiation condition is fulfilled. If no condition is met, the calibration sequence is not initiated at all, as illustrated at 212. On the other hand, if the at least one calibration initiation condition is met, the calibration sequence is initiated at 204.

For example, a calibration initiation condition may refer to a condition that the apparatus needs to be connected to a charging device. If the calibration sequence is long and the amount of shooting parameter combinations is extensive, the calibration sequence might significantly consume the battery of the apparatus due to the calibration sequence. Thus, when the calibration sequence is performed only when the apparatus is being charged, the calibration sequence does not unnecessarily consume the battery of the apparatus.

In another embodiment of FIG. 2B, alternatively or in addition, the at least one calibration initiation condition comprises a condition met when the current time is within a set time of day. Therefore, the calibration sequence is initiated when the user is not using the apparatus for normal use, for example, at night time. This also provides an effect that the user is not annoyed when the calibration sequence if performed.

In another embodiment of FIG. 2B, alternatively or in addition, the at least one calibration initiation condition comprises a condition met when determining that the camera is in an immediate contact with a light blocking surface. This can be determined, for example, using data from a second camera of the apparatus. An apparatus, for example, a smart phone or a tablet comprises a front camera and a back camera. Data from the second camera may indicate that the apparatus is located in a dark environment. If the second camera is a front camera it can be deduced that the other camera is currently facing towards a light blocking surface, for example, a table surface. Based on data from a second camera, it is possible to verify that the camera is in an environment enabling initiation of the calibration sequence. The determination that the camera is currently facing towards a light blocking surface may be assisted by reading data from an acceleration sensor of the apparatus. If the data from the acceleration sensor indicates that the apparatus is stationary, this can be used to verify that the user is not currently using the apparatus and that the camera is in indeed facing towards a light blocking surface.

In another embodiment of FIG. 2B, alternatively or in addition, the at least one calibration initiation condition comprises a condition met when determining that the apparatus is moving based on data from the at least one of a gyroscope and an accelerometer and is in a locked state. The termed "locked state" may refer to a state of the apparatus where the apparatus is operational or powered on, but a user of the apparatus needs to unlock the apparatus (for example, by providing a pin code via a graphical user interface of the apparatus) before being able to use the apparatus. For example, if it is determined that the apparatus is currently in a dark environment but, at the same time, the apparatus is moving and in a locked state, this may mean that the user is currently carrying the apparatus in a pocket or a bag. Therefore, it is possible to initiate the calibration sequence even if the apparatus is not stationary.

In another embodiment of FIG. 2B, alternatively or in addition, the at least one calibration initiation condition comprises a condition met when determining that the apparatus is stationary based on data from the at least one of a gyroscope and an accelerometer and is in a locked state. When the apparatus is stationary and in a locked state, this means that the user is not currently using the apparatus, and the calibration sequence may be started.

FIG. 2B illustrates a solution that enables automatic initiation of a calibration sequence without any manual action or other input from a user. Further, since the calibration is initiated only when the apparatus is in a dark environment, calibration results are more reliable. Further, by using at least one calibration initiation condition, it is possible to more accurately define specific circumstances when to initiate the calibration sequence.

According to an aspect, there is provided an apparatus comprising at least one processor and at least one memory connected to the at least one processor. The at least one memory stores program instructions that, when executed by the at least one processor, cause the apparatus to determine based on at least one indicator that a camera connected to the apparatus is in a dark environment, initiate a calibration sequence of the camera in response to determining based on the at least one indicator that the camera connected to the apparatus is in a dark environment, capture, during the calibration sequence, multiple images with the camera with different sets of shooting parameters, cause analysis of the captured images to obtain camera calibration data, and store the camera calibration data in a memory of the apparatus.

In one embodiment, the at least one indicator comprises data from at least one of an ambient light sensor and a proximity sensor.

In one embodiment, alternatively or in addition, the at least one indicator comprises data from the camera.

In one embodiment, alternatively or in addition, the at least one indicator comprises data from a second camera of the apparatus.

In one embodiment, alternatively or in addition, the at least one memory stores program instructions that, when executed by the at least one processor, cause the apparatus to determine that at least one calibration initiation condition is met, and enable the initiation of the calibration sequence only when the at least one calibration initiation condition is met.

In one embodiment, alternatively or in addition, the at least one calibration initiation condition comprises a condition met when the apparatus is currently being charged.

In one embodiment, alternatively or in addition, the at least one calibration initiation condition comprises a condition met when the current time is within a set time of day.

In one embodiment, alternatively or in addition, the at least one calibration initiation condition comprises a condition met when determining that the camera is in an immediate contact with a light blocking surface.

In one embodiment, alternatively or in addition, the apparatus further comprises at least one of a gyroscope and an accelerometer, and wherein the at least one calibration initiation condition comprises a condition met when determining that the apparatus is moving based on data from the at least one of the gyroscope and the accelerometer and is in a locked state.

In one embodiment, alternatively or in addition, the apparatus further comprises at least one of a gyroscope and an accelerometer, and wherein the at least one calibration initiation condition comprises a condition met when determining that the apparatus is stationary based on data from the at least one of the gyroscope and the accelerometer and is in a locked state.

In one embodiment, alternatively or in addition, the at least one memory stores program instructions that, when executed by the at least one processor, cause the apparatus to determine whether the calibration data deviates from existing calibration data more than a predetermined amount, and discard the calibration data when the calibration data deviates from existing calibration data more than the predetermined amount.

In one embodiment, alternatively or in addition, the at least one memory stores program instructions that, when executed by the at least one processor, cause the apparatus to cause transmission of data relating to the captured images to a network server, and receive calibration data calculated based on the data relating to the captured images from the network server.

In one embodiment, alternatively or in addition, the shooting parameters comprise at least one of the following: temperature, gain and exposure time.

In one embodiment, alternatively or in addition, the apparatus is a mobile device, a smart phone, a computer, or a tablet computer.

According to another aspect, there is provided a method comprising determining based on at least one indicator that a camera connected to an apparatus is in a dark environment, wherein the at least one indicator comprises data from at least one of an ambient light sensor and a proximity sensor, initiating a calibration sequence of the camera in response to determining based on the at least one indicator that the camera connected to the apparatus is in a dark environment, capturing, during the calibration sequence, multiple images with the camera with different sets of shooting parameters, causing analysis of the captured images to obtain camera calibration data, and storing the camera calibration data in a memory.

In one embodiment, the at least one indicator comprises data from at least one of an ambient light sensor and a proximity sensor.

In one embodiment, alternatively or in addition, the at least one indicator comprises data from the camera.

In one embodiment, alternatively or in addition, the at least one indicator comprises data from a second camera of the apparatus.

In one embodiment, the method further comprises determining that at least one calibration initiation condition is met; and enabling the initiation of the calibration sequence only when the at least one calibration initiation condition is met.

In one embodiment, alternatively or in addition, the at least one calibration initiation condition comprises a condition met when the apparatus is currently being charged.

In one embodiment, alternatively or in addition, the at least one calibration initiation condition comprises a condition met when the current time is within a set time of day.

In one embodiment, alternatively or in addition, the at least one calibration initiation condition comprises a condition met when determining that the camera is in an immediate contact with a light blocking surface.

In one embodiment, alternatively or in addition, the at least one calibration initiation condition comprises a condition met when determining that the apparatus is moving based on data from the at least one of the gyroscope and the accelerometer and is in a locked state.

In one embodiment, alternatively or in addition, the at least one calibration initiation condition comprises a condition met when determining that the apparatus is stationary based on data from the at least one of the gyroscope and the accelerometer and is in a locked state.

According to another aspect, there is provided an apparatus comprising at least one processor, at least one memory connected to the at least one processor and a camera. The at least one memory stores program instructions that, when executed by the at least one processor, cause the apparatus to determine based on at least one indicator that the apparatus is in a dark environment, wherein the at least one indicator comprises data from at least one of an ambient light sensor and a proximity sensor, initiate a calibration sequence of the camera in response to determining based on the at least one indicator that the camera connected to the apparatus is in a dark environment, and capture, during the calibration sequence, multiple images with the camera with different sets of shooting parameters to enable determination of camera calibration data based on image data of the captured images.

According to another aspect, there is provided a computer program comprising program code, which when executed by a processor, causes the processor to determine based on at least one indicator that a camera connected to an apparatus is in a dark environment, initiate a calibration sequence of the camera in response to determining based on the at least one indicator that the camera connected to the apparatus is in a dark environment, capture, during the calibration sequence, multiple images with the camera with different sets of shooting parameters, cause analysis of the captured images to obtain camera calibration data, and store the camera calibration data in a memory of the apparatus.

According to another aspect, there is provided a computer comprising program code, which when executed by a processor, causes the processor to determine based on at least one indicator that a camera connected to an apparatus is in a dark environment, wherein the at least one indicator comprises data from at least one of an ambient light sensor and a proximity sensor, initiate a calibration sequence of the camera in response to determining based on the at least one indicator that the camera connected to the apparatus is in a dark environment, capture, during the calibration sequence, multiple images with the camera with different sets of shooting parameters, cause analysis of the captured images to obtain camera calibration data, and store the camera calibration data in a memory.

In one embodiment, the computer program is embodied on a computer-readable medium or on a non-transitory computer-readable medium.

According to another aspect, there is provided an apparatus comprising means for determining based on at least one indicator that a camera connected to the apparatus is in a dark environment, means for initiating a calibration sequence of a camera in response to determining based on the at least one indicator that the camera connected to the apparatus is in a dark environment, means for capturing, during the calibration sequence, multiple images with the camera with different sets of shooting parameters, means for causing analysis of the captured images to obtain camera calibration data, and means for storing the camera calibration data in a memory of the apparatus.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The functions described herein performed by a controller may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software can be suitable for execution on a parallel processor or a serial processor such that the method steps may be carried out in any suitable order, or simultaneously.

Although the subject matter may have been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

One or more of the embodiments described above and/or aspects of any of the embodiments described above may be combined with aspects of any of the other embodiments described to form further embodiments without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. An apparatus comprising:
   at least one processor; and
   at least one memory connected to the at least one processor;
   wherein the at least one memory stores program instructions that, when executed by the at least one processor, cause the apparatus to:
   determine based on at least one indicator that a camera connected to the apparatus is in a dark environment;
   initiate a calibration sequence of a camera in response to determining based on the at least one indicator that the camera connected to the apparatus is in a dark environment;
   capture, during the calibration sequence, multiple images with the camera with different sets of shooting parameters;
   cause analysis of the captured images to obtain camera calibration data; and
   store the camera calibration data in a memory of the apparatus.

2. An apparatus according to claim 1, wherein the at least one indicator comprises data from at least one of an ambient light sensor and a proximity sensor.

3. An apparatus according to claim 1, the at least one indicator comprises data from the camera.

4. An apparatus according to claim 1, the at least one indicator comprises data from a second camera of the apparatus.

5. An apparatus according to claim 1, wherein the at least one memory stores program instructions that, when executed by the at least one processor, cause the apparatus to:
   determine that at least one calibration initiation condition is met; and
   enable the initiation of the calibration sequence only when the at least one calibration initiation condition is met.

6. An apparatus according to claim 5, wherein the at least one calibration initiation condition comprises a condition met when the apparatus is currently being charged.

7. An apparatus according to claim 5, wherein the at least one calibration initiation condition comprises a condition met when the current time is within a set time of day.

8. An apparatus according to claim 5, wherein the at least one calibration initiation condition comprises a condition met when determining that the camera is in an immediate contact with a light blocking surface.

9. An apparatus according to claim 5, wherein the apparatus further comprises at least one of a gyroscope and an accelerometer, wherein the at least one calibration initiation condition comprises a condition met when determining that the apparatus is moving based on data from the at least one of the gyroscope and the accelerometer and is in a locked state.

10. An apparatus according to claim 5, wherein the apparatus further comprises at least one of a gyroscope and an accelerometer, wherein the at least one calibration initiation condition comprises a condition met when determining that the apparatus is stationary based on data from the at least one of the gyroscope and the accelerometer and is in a locked state.

11. An apparatus according to claim 1, wherein the at least one memory stores program instructions that, when executed by the at least one processor, cause the apparatus to:
   determine whether the calibration data deviates from existing calibration data more than a predetermined amount; and
   discard the calibration data when the calibration data deviates from existing calibration data more than the predetermined amount.

12. An apparatus according to claim 1, wherein the at least one memory stores program instructions that, when executed by the at least one processor, cause the apparatus to:
   cause transmission of data relating to the captured images to a network server; and
   receive calibration data calculated based on the data relating to the captured images from the network server.

13. An apparatus according to claim 1, wherein the shooting parameters comprise at least one of the following: temperature, gain and exposure time.

14. An apparatus according to claim 1, wherein the apparatus is a mobile device, a smart phone, a computer, or a tablet computer.

15. A method comprising:
   determining based on at least one indicator that a camera is in a dark environment, wherein the at least one indicator comprises data from at least one of an ambient light sensor and a proximity sensor;
   initiating a calibration sequence of the camera in response to determining based on the at least one indicator that the camera connected to the apparatus is in a dark environment;
   capturing, during the calibration sequence, multiple images with the camera with different sets of shooting parameters;
   causing analysis of the captured images to obtain camera calibration data; and
   storing the camera calibration data in a memory.

16. A method according to claim 15, further comprising:
   determining that at least one calibration initiation condition is met, wherein the at least one calibration initiation condition comprises a condition met when the apparatus is currently being charged; and
   enabling the initiation of the calibration sequence only when the at least one calibration initiation condition is met.

17. A method according to claim 15, further comprising:
   determining that at least one calibration initiation condition is met, wherein the at least one calibration initiation condition comprises a condition met when the current time is within a set time of day; and
   enabling initiation of the calibration sequence only when the at least one calibration initiation condition is met.

18. A method according to claim 15, further comprising:
   determining that at least one calibration initiation condition is met, wherein the at least one calibration initiation condition comprises a condition met when determining that the camera is in an immediate contact with a light blocking surface; and
   enabling the initiation of the calibration sequence only when the at least one calibration initiation condition is met.

19. A method according to claim 15, further comprising:
   determining that at least one calibration initiation condition is met, wherein the at least one calibration initiation condition comprises a condition met when determining that the apparatus is moving based on data from at least one of a gyroscope and an accelerometer and is in a locked state; and
   enabling the initiation of the calibration sequence only when the at least one calibration initiation condition is met.

20. An apparatus comprising:
   at least one processor;
   at least one memory connected to the at least one processor;
   a camera;
   wherein the at least one memory stores program instructions that, when executed by the at least one processor, cause the apparatus to:
   determine based on at least one indicator that the apparatus is in a dark environment;
   initiate a calibration sequence of the camera in response to determining based on the at least one indicator that the camera connected to the apparatus is in a dark environment; and
   capture, during the calibration sequence, multiple images with the camera with different sets of shooting parameters to enable determination of camera calibration data based on image data of the captured images.

* * * * *